US010700916B2

(12) United States Patent
Ying (10) Patent No.: US 10,700,916 B2
(45) Date of Patent: Jun. 30, 2020

(54) STREAMING MEDIA FILE PROCESSING METHOD AND APPARATUS

(71) Applicant: Tencent Technology (Shenzhen) Company Limited, Shenzhen (CN)

(72) Inventor: Yulong Ying, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 126 days.

(21) Appl. No.: 15/706,376

(22) Filed: Sep. 15, 2017

(65) Prior Publication Data

US 2018/0006868 A1 Jan. 4, 2018

Related U.S. Application Data

(63) Continuation-in-part of application No. PCT/CN2016/104338, filed on Nov. 2, 2016.

(30) Foreign Application Priority Data

Nov. 2, 2015 (CN) .......................... 2015 1 0737843

(51) Int. Cl.
*G06F 15/16* (2006.01)
*H04L 29/06* (2006.01)
(Continued)

(52) U.S. Cl.
CPC ........ *H04L 29/06517* (2013.01); *G06F 16/40* (2019.01); *G06F 16/95* (2019.01);
(Continued)

(58) Field of Classification Search
CPC ........... H04L 29/06517; H04L 65/4084; H04L 67/02; H04L 67/06; H04L 69/18;
(Continued)

(56) References Cited

U.S. PATENT DOCUMENTS 6,029,200 A * 2/2000 Beckerman ............. H04L 29/06
709/226
6,415,327 B1 * 7/2002 Beckerman ............. H04L 29/06
709/226

(Continued)

FOREIGN PATENT DOCUMENTS

CN 101009825 A 8/2007
CN 101635635 A 1/2010
(Continued)

OTHER PUBLICATIONS

Tencent Technology, ISRWO, PCT/2016/104338, dated Feb. 6, 2017, 7 pgs.

(Continued)

*Primary Examiner* — Philip B Tran
(74) *Attorney, Agent, or Firm* — Morgan, Lewis & Bockius LLP (57) ABSTRACT

A media file processing method, comprising: receiving a request for downloading a target streaming media file; obtaining, in response to the request, a uniform resource locator (URL) of the target streaming media file; determining, according to first pattern information of a header of the URL, whether the target streaming media file is a streaming media file of a Microsoft Media Server (MMS) Protocol; in accordance with a determination that the target streaming media file is a streaming media file of the MMS Protocol, determining, according to a preset correspondence between URL pattern information and a plurality of network communication protocols, a first network communication protocol of the plurality of network communication protocols, that corresponds to the first pattern information of the header of the URL as a target network communication protocol; and obtaining the target streaming media file from a target server by using the target network communication protocol.

11 Claims, 8 Drawing Sheets

(51) Int. Cl.
  *G06F 16/40* (2019.01)
  *H04L 29/08* (2006.01)
  *G06F 16/95* (2019.01)

(52) U.S. Cl.
  CPC ........ *H04L 65/4084* (2013.01); *H04L 65/608* (2013.01); *H04L 67/02* (2013.01); *H04L 67/06* (2013.01); *H04L 69/18* (2013.01); *H04L 69/22* (2013.01); *H04L 29/06027* (2013.01); *H04L 29/06047* (2013.01)

(58) Field of Classification Search
  CPC .............. H04L 69/22; H04L 29/06027; H04L 29/06047; G06F 16/40; G06F 16/95
  USPC ........................................ 709/231, 224, 230
  See application file for complete search history.

(56) References Cited

U.S. PATENT DOCUMENTS

| | | | |
|---|---|---|---|
| 6,553,376 B1 * | 4/2003 | Lewis ................ | H04L 65/1043 |
| 6,813,690 B1 * | 11/2004 | Lango ................ | G06F 12/0866 |
| | | | 707/999.103 |
| 7,657,644 B1 * | 2/2010 | Zheng ................ | H04L 12/1886 |
| | | | 709/231 |
| 7,886,068 B1 * | 2/2011 | Rao ................... | H04L 29/08729 |
| | | | 709/203 |
| 2002/0161911 A1 * | 10/2002 | Pinckney, III ..... | H04N 7/17336 |
| | | | 709/231 |
| 2006/0259637 A1 * | 11/2006 | Yadav .................... | G06F 16/40 |
| | | | 709/231 |
| 2010/0030908 A1 * | 2/2010 | Courtemanche .... | H04L 65/4084 |
| | | | 709/231 |

FOREIGN PATENT DOCUMENTS

| | | |
|---|---|---|
| CN | 101924758 A | 12/2010 |
| CN | 102082761 A | 6/2011 |
| CN | 102098571 A | 6/2011 |
| CN | 104469477 A | 3/2015 |
| EP | 1557989 A1 | 7/2005 |

OTHER PUBLICATIONS

Tencent Technology, IPRP, PCT/2016/104338, dated May 8, 2018, 6 pgs.

* cited by examiner

STREAMING MEDIA FILE PROCESSING METHOD AND APPARATUS

RELATED APPLICATION

This application is a continuation-in-part application of PCT/CN2016/104338, entitled "STREAMING MEDIA FILE PROCESSING METHOD AND DEVICE" filed on Nov. 2, 2016, which claims priority to Chinese Patent Application No. 201510737843.4, filed with the State Intellectual Property Office of the People's Republic of China on Nov. 2, 2015, and entitled "STREAMING MEDIA FILE PROCESSING METHOD AND APPARATUS", both of which are incorporated herein by reference in their entirety.

FIELD OF THE TECHNOLOGY

This application relates to the field of multimedia processing technologies, and in particular, to a streaming media file processing method, a streaming media file processing apparatus, and a non-volatile storage medium.

BACKGROUND OF THE DISCLOSURE

With the popularity of mobile terminals such as smartphones, more users become accustomed to viewing multimedia files on the Internet by using mobile terminals, for example, watching videos provided by video websites on smartphones. Viewing multimedia files by using mobile terminals by a user is often implemented based on a streaming media protocol. The streaming media refers to a media format of implementing online playing by means of streaming transmission. A playback-while-download service function can be implemented by using the streaming media protocol.

Currently, common streaming media protocols mainly include the HLS Protocol (HTTP Live Streaming Protocol), the RTSP Protocol (Real Time Streaming Protocol), the RTP Protocol (Real-time Transport Protocol), the MMS Protocol (Microsoft Media Server Protocol), and the like. The existing multimedia players in the mobile terminal usually support the HLS Protocol and the RTSP/RTP Protocol, but do not support the MMS Protocol. Therefore, a user cannot download or view multimedia files of the MMS Protocol on a mobile terminal.

SUMMARY

In view of this, this disclosure provides a streaming media file processing method, a streaming media file processing apparatus and a non-volatile storage medium, to resolve a problem that existing multimedia players in a mobile terminal do not support the MMS Protocol, and consequently, a user cannot download or view multimedia files of the MMS Protocol.

To achieve the foregoing objective, the following solutions are provided:

According to an aspect of the present disclosure, a streaming media file processing method is provided, applied to a mobile terminal. The method includes:

obtaining, in response to a request for downloading a target streaming media file, a uniform resource locator URL of the target streaming media file;

determining, according to pattern information of a header of the URL, whether the target streaming media file is a streaming media file of the Microsoft Media Server MMS Protocol;

if the target streaming media file is a streaming media file of the Microsoft Media Server MMS Protocol, determining, according to a preset correspondence between the pattern information and a network communication protocol, a network communication protocol corresponding to the pattern information of the header of the URL as a target network communication protocol; and obtaining the target streaming media file from a target server by using the target network communication protocol.

According to another aspect of the present disclosure, a streaming media file processing apparatus is provided, applied to a mobile terminal. The apparatus includes:

a URL obtaining unit, configured to obtain, in response to a request for downloading a target streaming media file, a uniform resource locator URL of the target streaming media file;

a file determining unit, configured to determine, according to pattern information of a header of the URL, whether the target streaming media file is a streaming media file of the Microsoft Media Server MMS Protocol;

a communication protocol determining unit, configured to: when a determining result of the file determining unit is that the target streaming media file is a streaming media file of the Microsoft Media Server MMS Protocol, determine, according to a preset correspondence between the pattern information and a network communication protocol, a network communication protocol corresponding to the pattern information of the header of the URL as a target network communication protocol; and a file data obtaining unit, configured to obtain the target streaming media file from a target server by using the target network communication protocol.

According to still another aspect of the present disclosure, a non-volatile storage medium is provided, configured to store one or more computer programs, the computer program including an instruction that can be executed by a processor having one or more memories; the processor executing the instruction, to perform the streaming media file processing method described above.

As can be learned from the foregoing technical solutions, a streaming media file processing method provided in embodiments of this application is applied to a mobile terminal, and the method includes: obtaining, in response to a request for downloading a target streaming media file, a URL of the target streaming media file; determining, according to pattern information of a header of the URL, whether the target streaming media file is a streaming media file of the MMS Protocol; if the target streaming media file is a streaming media file of the MMS Protocol, determining, according to a preset correspondence between the pattern information and a network communication protocol, a target network communication protocol corresponding to the pattern information of the URL; and further obtaining data of the target streaming media file from a target server by using the target network communication protocol. In this application, whether the streaming media file is a file of the MMS Protocol is determined by using the URL of the streaming media file; if it is determined that the streaming media file is a file of the MMS Protocol, a network communication protocol corresponding to the pattern information of the URL of the target streaming media file is further determined according to the preset correspondence between the pattern information of the URL and the network communication protocol; and further, the data of the target streaming media file may be obtained according to the protocol. Therefore, download of the streaming media file of the MMS Protocol is implemented in the mobile terminal, thereby bringing convenience to users.

BRIEF DESCRIPTION OF THE DRAWINGS

To describe the technical solutions in the embodiments of this application or in existing technology more clearly, the following briefly introduces the accompanying drawings required for describing the embodiments or the existing technology. Apparently, the accompanying drawings in the following description show merely the embodiments of this application, and a person of ordinary skill in the art may still derive other drawings from these accompanying drawings without creative efforts.

DESCRIPTION OF EMBODIMENTS

The technical solutions in embodiments of this application are clearly described in the following with reference to the accompanying drawings. Apparently, the embodiments to be described are merely a part rather than all of the embodiments of this application. All other embodiments obtained by persons of ordinary skill in the art based on the embodiments of this application without creative efforts shall fall within the protection scope of this application.

Figure 1:
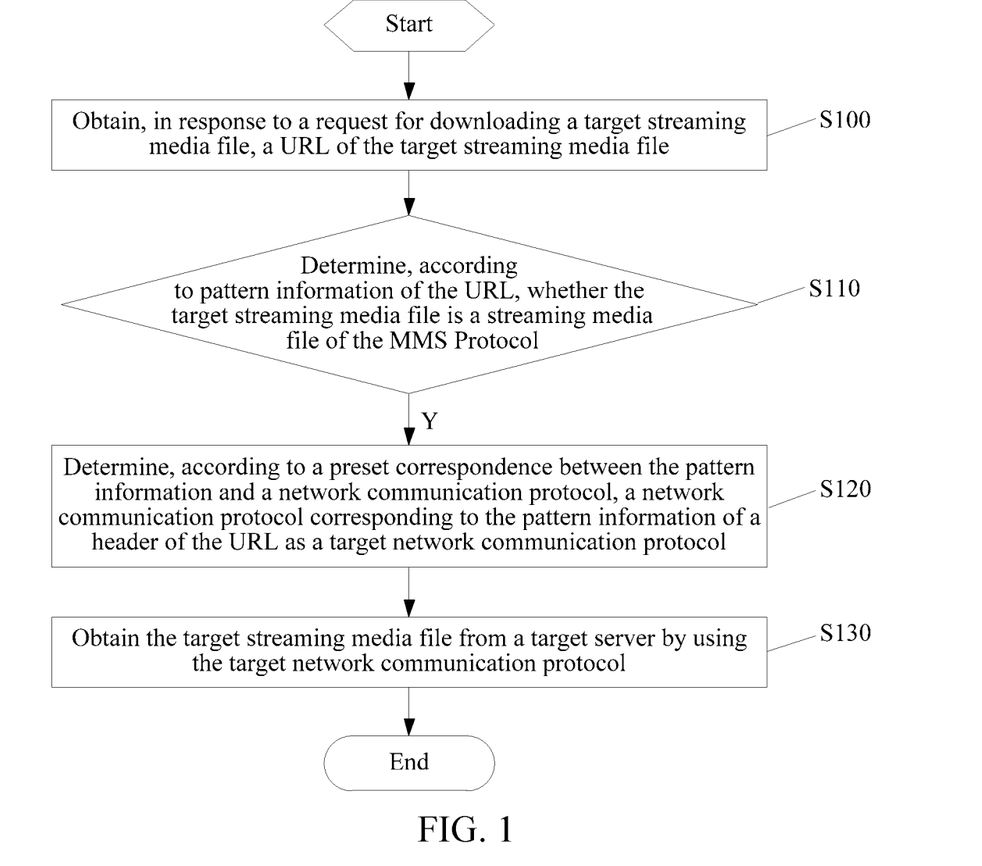
FIG. 1 is a flowchart of a streaming media file processing method in accordance with some embodiments.

Existing multimedia players in a mobile terminal usually do not support playing of multimedia files of the MMS Protocol. That is, when a user intends to view a multimedia file of the MMS Protocol in the mobile terminal, the existing players in the mobile terminal may have errors, and cannot download or play the multimedia files of the MMS Protocol. Therefore, to resolve the foregoing problems, the embodiments of this application provide a streaming media file processing method and a streaming media file processing apparatus that are applied to a mobile terminal. Referring to FIG. 1, FIG. 1 is a flowchart of a streaming media file processing method according to an embodiment of this application.

As shown in FIG. 1, the method includes:

Step S100: Obtain, in response to a request for downloading a target streaming media file, a uniform resource locator URL of the target streaming media file.

The method of this application may be applied to a browser of the mobile terminal, a social network client application, or a multimedia player of the mobile terminal. An example in which the mobile terminal is a mobile phone is used to perform description. When a user taps to select a target streaming media file in user interface (e.g., a browser user interface) of the mobile phone, a request for downloading the target streaming media file is triggered, and a URL (Uniform Resource Locator) of the target streaming media file is obtained by a streaming media file processing apparatus of this application.

For a URL, each file on the Internet has a unique URL, and information included in the URL indicates a location of the file and how the browser should process the URL. The URL includes a pattern (or referred to as a "protocol portion") part and a domain name address part. The pattern part is located at a header portion of the URL. Pattern information and domain name address information are usually separated by "://". For example, a common URL of Baidu is https://www.baidu.com/, where "https" is the pattern information, and "www.baidu.com/" is domain name address information.

Step S110: Determine, according to the pattern information of the header of the URL, whether the target streaming media file is a streaming media file of the MMS Protocol; and if the target streaming media file is a streaming media file of the MMS Protocol, perform step S120.

Specifically, the pattern information of the header of the URL is determined by a server on a supplier side of the streaming media file. The server stipulates a streaming media protocol of the streaming media file, and a network communication protocol supported by the streaming media protocol. Therefore, in this step, whether the target streaming media file is a streaming media file of the MMS Protocol can be determined by using the pattern information of the header of the URL. If the streaming media protocol is not the MMS Protocol but another type of protocol originally supported by the mobile terminal, processing is performed according to an existing process.

Step S120: Determine, according to a preset correspondence between the pattern information and a network communication protocol (e.g., in a lookup table listing the correspondence between different pattern information and different network communication protocols), a network communication protocol corresponding to the pattern information of the header of the URL as a target network communication protocol.

A server in which a streaming media file of the MMS Protocol is located stipulates a network communication protocol supported by the file. The mobile terminal, only by using the stipulated network communication protocol, may obtain the file from the server. Different streaming media files of the MMS Protocol support different network communication protocols. For example, some streaming media files of the MMS Protocol support the HTTP network communication protocol, and some streaming media files support the TCP network communication protocol. Therefore, an identifier may be added to the pattern information of the URL of the streaming media file to identify a network communication protocol supported by the streaming media file.

This application presets the correspondence between the pattern information and the network communication protocol, and when it is determined that the target streaming media file is a streaming media file of the MMS Protocol, a network communication protocol corresponding to the pattern information of the target streaming media file is queried and determined as the target network communication protocol.

Step S130: Obtain the target streaming media file from a target server by using the target network communication protocol.

Specifically, a domain name address of the URL of the target streaming media file designates a server in which the file is located, that is, the target server. Data of the target streaming media file is obtained, by using the target network communication protocol determined in the previous step, from the server designated by the domain name address of the URL.

A streaming media file processing method provided in this application is applied to a mobile terminal. The method includes: obtaining, in response to a request for downloading a target streaming media file, a URL of the target streaming media file; determining, according to pattern information of a header of the URL, whether the target streaming media file is a streaming media file of the MMS Protocol; if the target streaming media file is a streaming media file of the MMS Protocol, determining, according to a preset correspondence between the pattern information and a network communication protocol, a target network communication protocol corresponding to the pattern information of the URL; and further obtaining the target streaming media file from a target server by using the target network communication protocol. In this application, whether the streaming media file is a file of the MMS Protocol is determined by using the URL of the streaming media file; if it is determined that the streaming media file is a file of the MMS Protocol, a network communication protocol corresponding to the pattern information of the URL of the target streaming media file is further determined according to a preset correspondence between the pattern information of the URL and the network communication protocol; and further, the target streaming media file may be obtained according to the protocol. Therefore, download of the streaming media file of the MMS Protocol is implemented in the mobile terminal, thereby bringing convenience to users.

Figure 2:
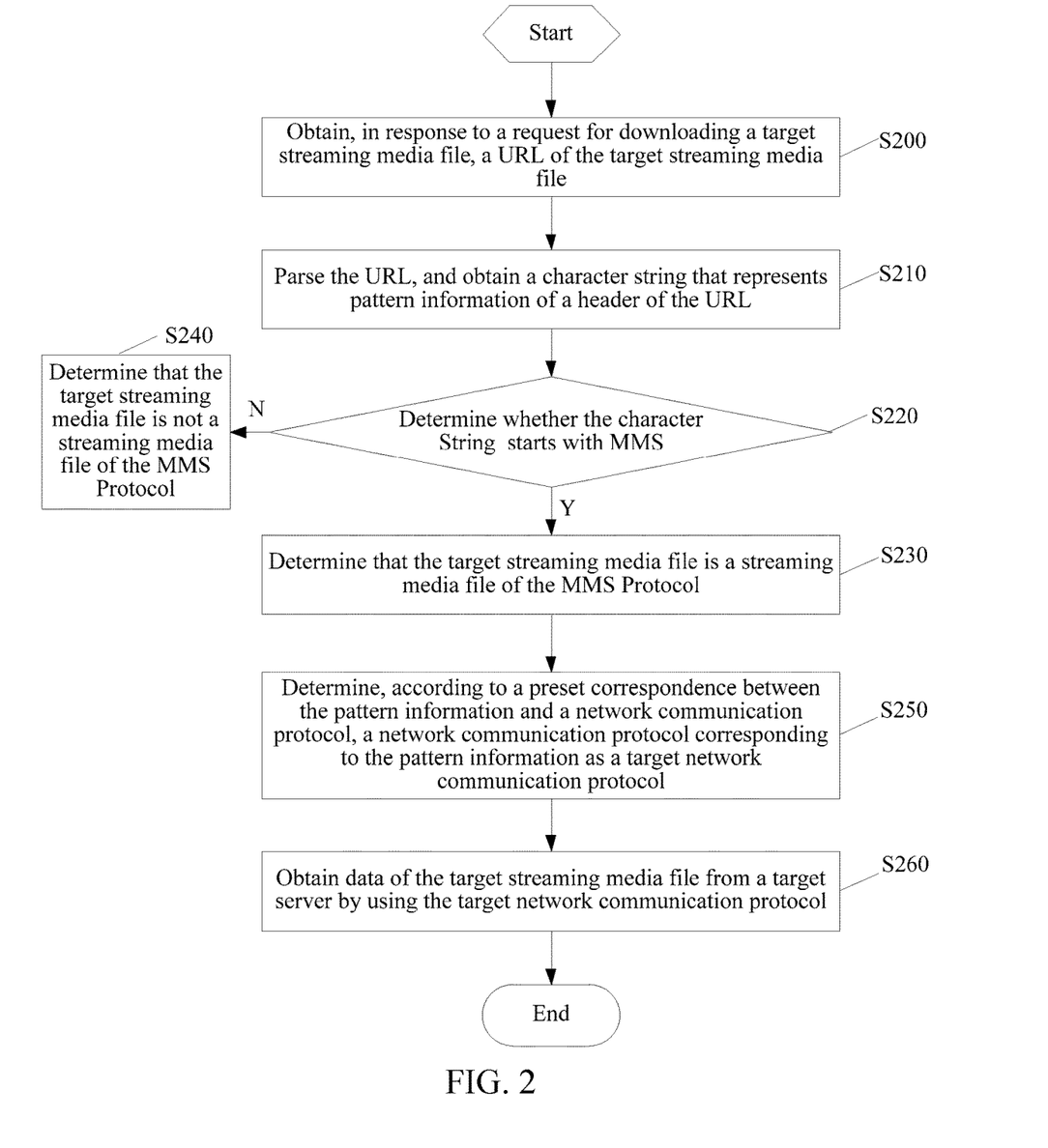
FIG. 2 is a flowchart of a streaming media file processing method in accordance with some embodiments.

Referring to FIG. 2, FIG. 2 is a flowchart of a streaming media file processing method according to some embodiments.

As shown in FIG. 2, the method includes:

Step S200: Obtain, in response to a request for downloading a target streaming media file, a URL of the target streaming media file.

Step S210: Parse the URL, and obtain a character string that represents pattern information of a header of the URL.

By parsing the URL, the character string that represents the pattern information of the URL may be obtained. Generally, the URL is constituted by a plurality of character strings and symbols. In this embodiment, "://" may be used as an identifier, and the character strings before the "://" are extracted and used as the character string that represents the pattern information of the URL.

Step S220: Determine whether the character string starts with MMS; and if the character string starts with MMS, perform step S230; otherwise, perform step S240.

Step S230: Determine that the target streaming media file is a streaming media file of the MMS Protocol, and further perform step S250.

Specifically, the pattern information of the URL of the streaming media file of the MMS Protocol may be stipulated to start with characters "MMS". In this way, if it is found that the pattern information of the target streaming media file starts with the characters "MMS", the target streaming media file is determined as a streaming media file of the MMS Protocol.

Step S240: Determine that the target streaming media file is not a streaming media file of the MMS Protocol.

Step S250: Determine, according to a preset correspondence between the pattern information and a network communication protocol, a network communication protocol corresponding to the pattern information as a target network communication protocol.

This application presets the correspondence between the pattern information and the network communication protocol, and when it is determined that the target streaming media file is a streaming media file of the MMS Protocol, a network communication protocol corresponding to the pattern information of the target streaming media file is queried and determined as the target network communication protocol.

Step S260: Obtain data of the target streaming media file from a target server by using the target network communication protocol.

As disclosed herein, in some embodiments, whether a file is a file of the MMS Protocol is determined according to pattern information of a URL. Specifically, by parsing the URL, a character string that represents the pattern information is obtained. If it is determined that the character string starts with MMS, the file is determined as a streaming media file of the MMS Protocol.

Figure 3:
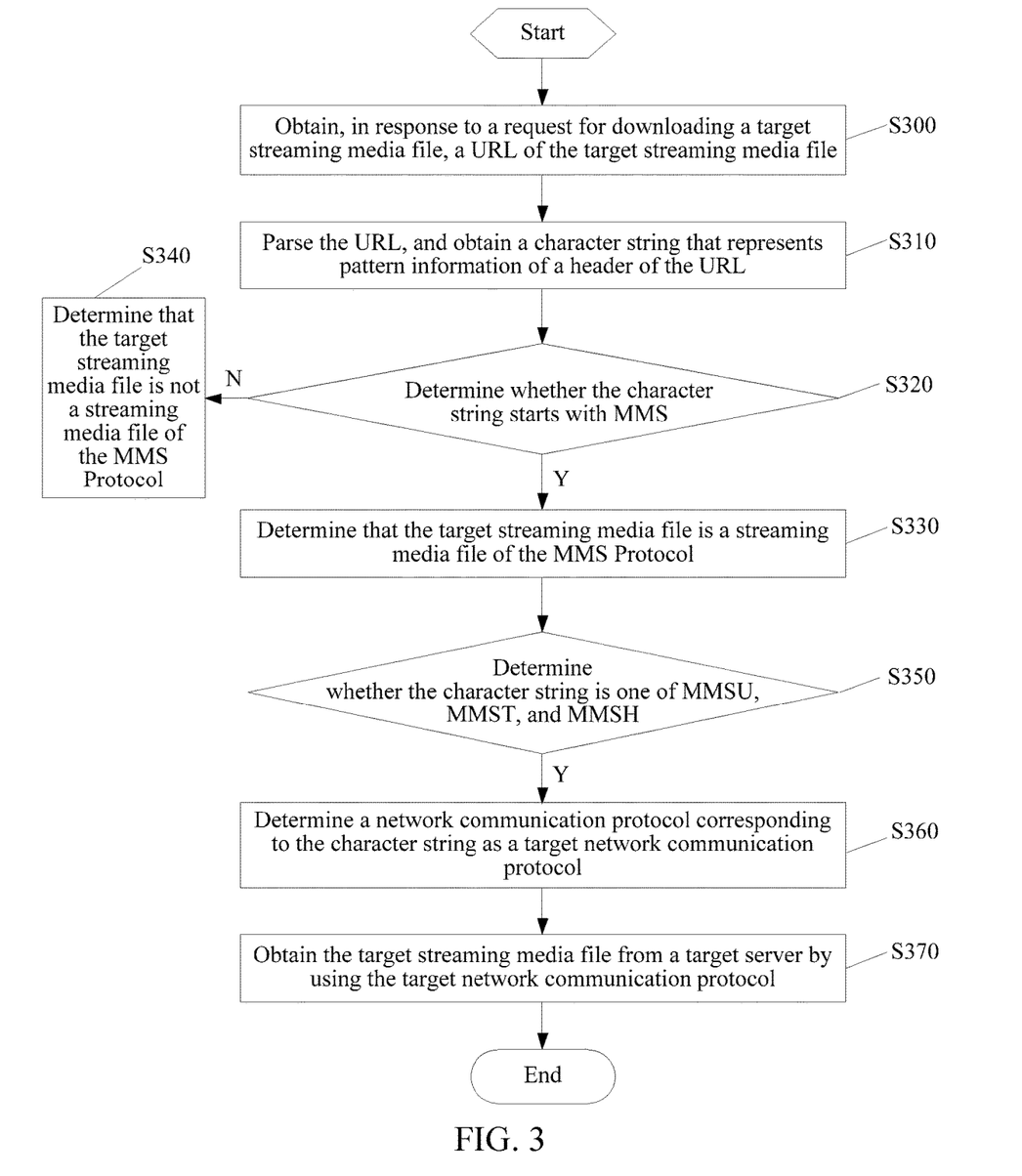
FIG. 3 is a flowchart of a streaming media file processing method in accordance with some embodiments.

Referring to FIG. 3, FIG. 3 is a flowchart of a streaming media file processing method in accordance with some embodiments.

As shown in FIG. 3, the method includes:

Step S300: Obtain, in response to a request for downloading a target streaming media file, a URL of the target streaming media file.

Step S310: Parse the URL, and obtain a character string that represents pattern information of a header of the URL.

By parsing the URL, the character string that represents the pattern information of the URL may be obtained. Generally, the URL is constituted by a plurality of character strings and symbols. In this embodiment, "://" may be used as an identifier, and the character strings before the "://" are extracted and used as the character string that represents the pattern information of the URL.

Step S320: Determine whether the character string starts with MMS; and if the character string starts with MMS, perform step S330; otherwise, perform step S340.

Step S330: Determine that the target streaming media file is a streaming media file of the MMS Protocol, and further perform step S350.

Specifically, the pattern information of the URL of the streaming media file of the MMS Protocol may be stipulated to start with characters "MMS". In this way, if it is found that the pattern information of the target streaming media file starts with the characters "MMS", the target streaming media file is determined as a streaming media file of the MMS Protocol.

Step S340: Determine that the target streaming media file is not a streaming media file of the MMS Protocol.

Step S350: Determine whether the character string is one of MMSU, MMST, and MMSH; and if the character string is one of MMSU, MMST, and MMSH, perform step S360.

Step S360: Determine a network communication protocol corresponding to the character string as a target network communication protocol.

A network communication protocol corresponding to MMSU is the UDP Protocol (User Datagram Protocol), a network communication protocol corresponding to MMST is the TCP Protocol (Transmission Control Protocol), and a network communication protocol corresponding to MMSH is the HTTP Protocol (Hyper Text Transfer Protocol).

Step S370: Obtain the target streaming media file from a target server by using the target network communication protocol.

In this embodiment, it is stipulated that a network communication protocol corresponding to MMSU is the User Datagram Protocol UDP Protocol, a network communication protocol corresponding to MMST is the Transmission Control Protocol TCP Protocol, and a network communication protocol corresponding to MMSH is the Hyper Text Transfer Protocol HTTP Protocol. Therefore, if pattern information of a URL of a streaming media file is MMSU, it indicates that the streaming media file supports the UDP network communication protocol; if pattern information of a URL of a streaming media file is MMST, it indicates that the streaming media file supports the TCP network communication protocol; and so on.

Certainly, the UDP, TCP, and HTTP network communication protocols are existing relatively mature communication protocols. Generally, a streaming media file of the MMS Protocol supports only one selected from the three network communication protocols. Therefore, this embodiment merely stipulates pattern information corresponding to the three communication protocols: MMSU, MMST, and MMSH, but the present disclosure is not limited thereto. Corresponding pattern information may be set for a streaming media file of the MMS Protocol that supports another network communication protocol, and details are not described in this embodiment again.

Figure 4:
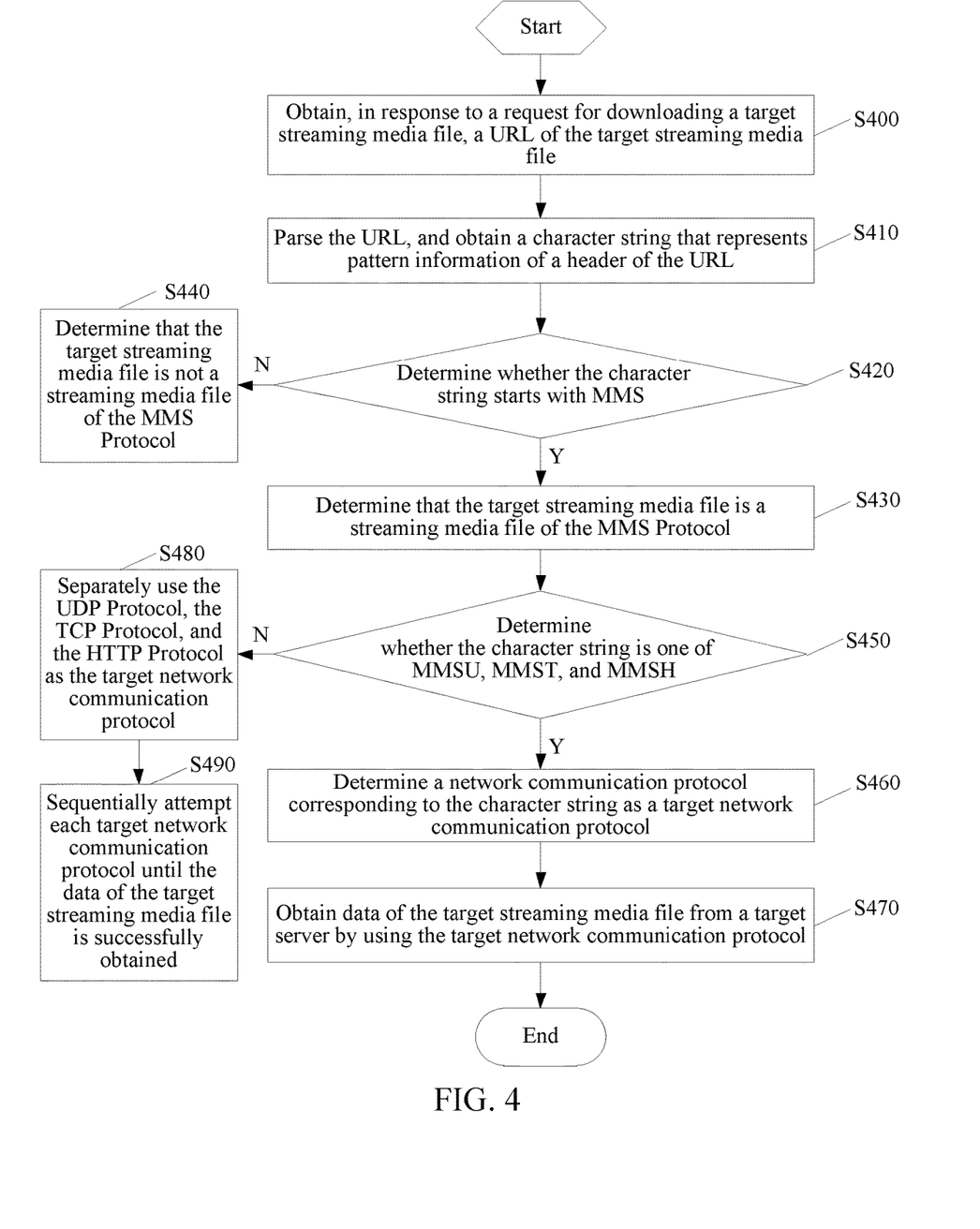
FIG. 4 is a flowchart of a streaming media file processing method in accordance with some embodiments.

Referring to FIG. 4, FIG. 4 is a flowchart of a streaming media file processing method in accordance with some embodiments.

As shown in FIG. 4, the method includes:

Step S400: Obtain, in response to a request for downloading a target streaming media file, a URL of the target streaming media file.

Step S410: Parse the URL, and obtain a character string that represents pattern information of a header of the URL.

By parsing the URL, the character string that represents the pattern information of the URL may be obtained. Generally, the URL is constituted by a plurality of character strings and symbols. In this embodiment, "://" may be used as an identifier, and the character strings before the "://" are extracted and used as the character string that represents the pattern information of the URL.

Step S420: Determine whether the character string starts with MMS; and if the character string starts with MMS, perform step S430; otherwise, perform step S440.

Step S430: Determine that the target streaming media file is a streaming media file of the MMS Protocol, and further perform step S450.

Specifically, the pattern information of the URL of the streaming media file of the MMS Protocol may be stipulated to start with characters "MMS". In this way, if it is found that the pattern information of the target streaming media file starts with the characters "MMS", the target streaming media file is determined as a streaming media file of the MMS Protocol.

Step S440: Determine that the target streaming media file is not a streaming media file of the MMS Protocol.

Step S450: Determine whether the character string is one of MMSU, MMST, and MMSH; and if the character string is one of MMSU, MMST, and MMSH, perform step S460; otherwise, perform step S480.

Step S460: Determine a network communication protocol corresponding to the character string as a target network communication protocol.

A network communication protocol corresponding to MMSU is the UDP Protocol (User Datagram Protocol), a network communication protocol corresponding to MMST is the TCP Protocol (Transmission Control Protocol), and a network communication protocol corresponding to MMSH is the HTTP Protocol (Hyper Text Transfer Protocol).

Step S470: Obtain data of the target streaming media file from a target server by using the target network communication protocol.

The target server is a server designated by a domain name address of the URL.

Step S480: Separately use the UDP Protocol, the TCP Protocol, and the HTTP Protocol as the target network communication protocol.

Step S490: Sequentially attempt each target network communication protocol until the data of the target streaming media file is successfully obtained.

Specifically, it is attempted to pull, by sequentially using each target network communication protocol, the data of the target streaming media file from a server designated by the domain name address part of the URL, until the data of the target streaming media file is successfully pulled.

It should be noted that, in some cases, when a URL of a streaming media file of the MMS Protocol is set, due to a reason such as negligence, a pattern part is not marked, and MMS is directly used as pattern information of the URL. In view of this case, in this embodiment, attempting is performed in a sequence of the UDP Protocol, the TCP Protocol, and the HTTP Protocol one by one, until data of the file is successfully pulled.

Figure 5:
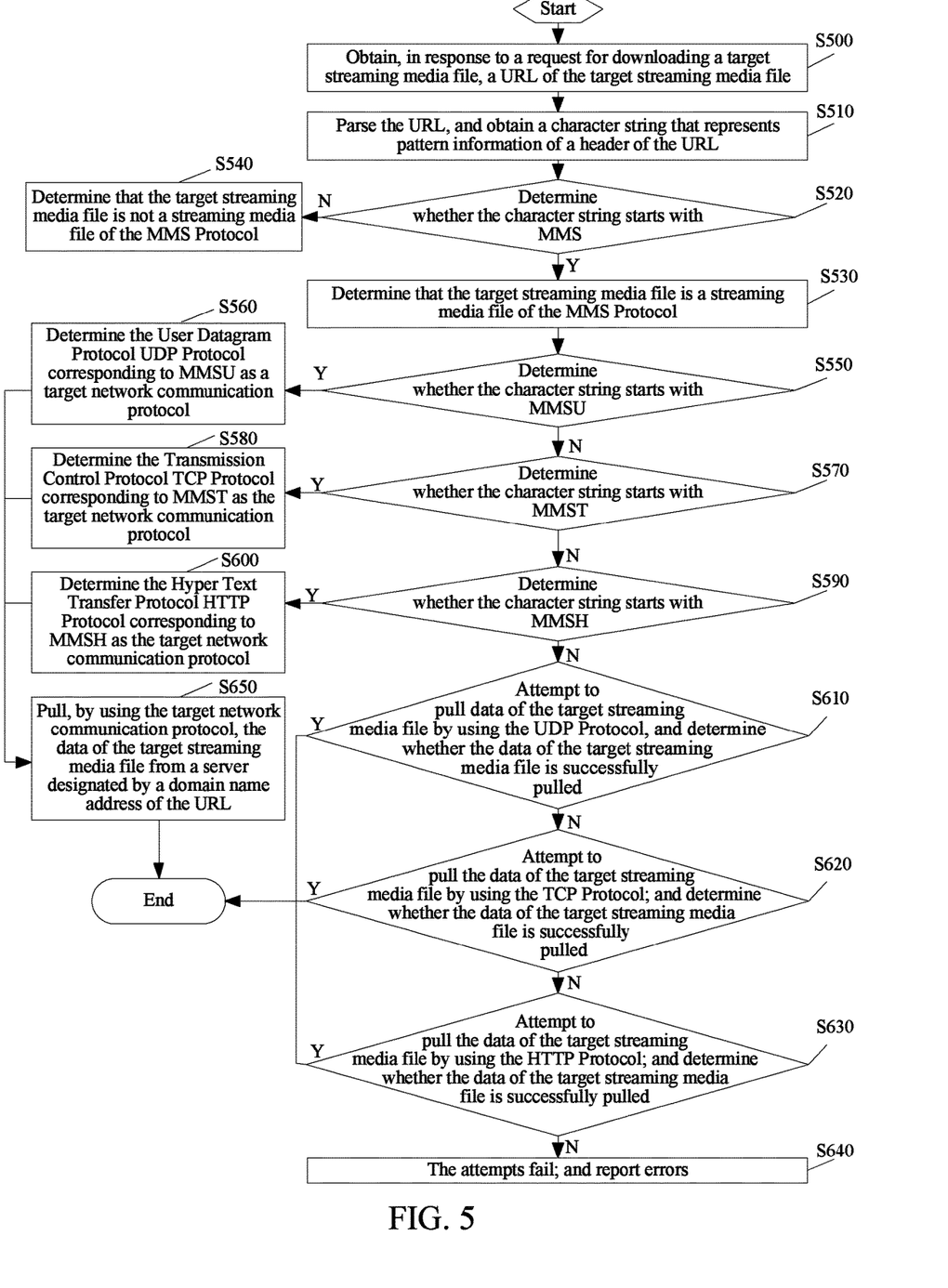
FIG. 5 is a flowchart of a streaming media file processing method in accordance with some embodiments.

Referring to FIG. 5, FIG. 5 is a flowchart of a streaming media file processing method in accordance with some embodiments.

As shown in FIG. 5, the method includes:

Step S500: Obtain, in response to a request for downloading a target streaming media file, a URL of the target streaming media file.

Step S510: Parse the URL, and obtain a character string that represents pattern information of a header of the URL.

By parsing the URL, the character string that represents the pattern information of the URL may be obtained. Generally, the URL is constituted by a plurality of character strings and symbols. In this embodiment, "://" may be used as an identifier, and the character strings before the "://" are extracted and used as the character string that represents the pattern information of the URL.

Step S520: Determine whether the character string starts with MMS; and if the character string starts with MMS, perform step S530; otherwise, perform step S540.

Step S530: Determine that the target streaming media file is a streaming media file of the MMS Protocol, and further perform step S550.

Step S540: Determine that the target streaming media file is not a streaming media file of the MMS Protocol.

Specifically, the pattern information of the URL of the streaming media file of the MMS Protocol may be stipulated to start with characters "MMS". In this way, if it is found that the pattern information of the target streaming media file starts with the characters "MMS", the target streaming media file is determined as a streaming media file of the MMS Protocol.

Step S550: Determine whether the character string starts with MMSU; and if the character string starts with MMSU, perform step S560; otherwise, perform step S570.

Step S560: Determine the User Datagram Protocol UDP Protocol corresponding to MMSU as a target network communication protocol, and sequentially perform step S650.

Step S570: Determine whether the character string starts with MMST; and if the character string starts with MMST, perform step S580; otherwise, perform step S590.

Step S580: Determine the Transmission Control Protocol TCP Protocol corresponding to MMST as the target network communication protocol, and sequentially perform step S650.

Step S590: Determine whether the character string starts with MMSH; and if the character string starts with MMSH, perform step S600; otherwise, perform step S610.

Step S600: Determine the Hyper Text Transfer Protocol HTTP Protocol corresponding to MMSH as the target network communication protocol, and sequentially perform step S650.

Step S610: Attempt to pull data of the target streaming media file by using the UDP Protocol; determine whether the data of the target streaming media file is successfully pulled; and if the data of the target streaming media file is successfully pulled, end; otherwise, perform step S620.

Specifically, it is attempted to pull, by using the UDP Protocol, the data of the target streaming media file from a server designated by a domain name address part of the URL.

Step S620: Attempt to pull the data of the target streaming media file by using the TCP Protocol; determine whether the data of the target streaming media file is successfully pulled; and if the data of the target streaming media file is successfully pulled, end; otherwise, perform step S630.

Specifically, it is attempted to pull, by using the TCP Protocol, the data of the target streaming media file from the server designated by the domain name address part of the URL.

Step S630: Attempt to pull the data of the target streaming media file by using the HTTP Protocol; determine whether the data of the target streaming media file is successfully pulled; and if the data of the target streaming media file is successfully pulled, end; otherwise, perform step S640.

Specifically, it is attempted to pull, by using the HTTP Protocol, the data of the target streaming media file from the server designated by the domain name address part of the URL.

Step S640: The attempts fail; and report errors.

Step S650: Pull, by using the target network communication protocol, the data of the target streaming media file from the server designated by the domain name address of the URL.

This embodiment describes a process in which a network communication protocol is determined based on pattern information, and when the network communication protocol cannot be determined, it is attempted to download a file in a particular sequence one by one. Steps S550, S570 and S590 may be performed in a reversed sequence or performed simultaneously. Similarly, steps S610 to S630 may be performed in a reversed sequence or performed simultaneously.

Further, optionally, based on the foregoing embodiments, in this application, a decoder may be further created and initialized after data of a target streaming media file is pulled, and then the data of the target streaming media file is played after the data of the target streaming media file is decoded by the decoder.

Based on the above disclosure, in some embodiments, A media file processing method, comprising: at a device having one or more processors and memory: receiving a request for downloading a target streaming media file; obtaining, in response to the request for downloading the target streaming media file, a uniform resource locator (URL) of the target streaming media file; determining, according to first pattern information of a header of the URL, whether the target streaming media file is a streaming media file of a Microsoft Media Server (MMS) Protocol; in accordance with a determination that the target streaming media file is a streaming media file of the MMS Protocol, determining, according to a preset correspondence between URL pattern information and a plurality of network communication protocols, a first network communication protocol of the plurality of network communication protocols, that corresponds to the first pattern information of the header of the URL as a target network communication protocol; and obtaining the target streaming media file from a target server by using the target network communication protocol.

In some embodiments, the determining, according to the first pattern information of the header of the URL, whether the target streaming media file is a streaming media file of the MMS Protocol includes: parsing the URL to obtain a character string that represents the first pattern information of the header of the URL; determining whether the character string starts with "MMS", and, in accordance with a determination that the character string starts with "MMS", determining that the target streaming media file is a streaming media file of the MMS Protocol.

In some embodiments, the preset correspondence between the URL pattern information and the plurality of network communication protocols comprises: "MMSU" being corresponding to a User Datagram Protocol (UDP) Protocol, "MMST" being corresponding to a Transmission Control Protocol (TCP) Protocol, and "MMSH" being corresponding to a Hyper Text Transfer Protocol (HTTP) Protocol.

In some embodiments, the determining the first network communication protocol that corresponds to the first pattern information as the target network communication protocol includes: determining whether the character string comprises one of "MMSU", "MMST", and "MMSH"; and in accordance with a determination that the character string comprises one of "MMSU", "MMST", and "MMSH", selecting a respective network communication protocol corresponding to the character string as the target network communication protocol.

In some embodiments, the method includes: in accordance with a determination that the character string does not comprise any one of MMSU, MMST, and MMSH: initiating a first protocol communication attempt, including: initiating network communication with the target server by using the UDP Protocol, and in accordance with a determination that the network communication is successfully established using the UDP Protocol, using the UDP Protocol as the target network communication protocol; in accordance with a determination that the first protocol communication attempt has failed, initiating a second protocol communication attempt, including initiating network communication with the target server by using the TCP Protocol, and in accordance with a determination that the network communication is successfully established using the TCP Protocol, using the TCP Protocol as the target network communication protocol; and in accordance with a determination that the first protocol communication attempt and the second protocol communication attempt have both failed, initiating a third protocol communication attempt, including initiating network communication with the target server by using the HTTP Protocol, and in accordance with a determination that the network communication is successfully established using the HTTP Protocol, using the HTTP Protocol as the target network communication protocol.

In some embodiments, the target server is a server designated by a domain name address of the URL.

In some embodiments, the method includes: creating and initializing a decoder by using the obtained target streaming media file; and playing the target streaming media file after the target streaming media file is decoded by the decoder.

Other details of the method are described earlier with respect to FIGS. 1-5, and are not repeated herein in the interest of brevity.

The following describes a streaming media file processing apparatus provided in an embodiment of this application, and mutual reference may be made to the streaming media file processing apparatus described below and the streaming media file processing method described above.

Figure 6:
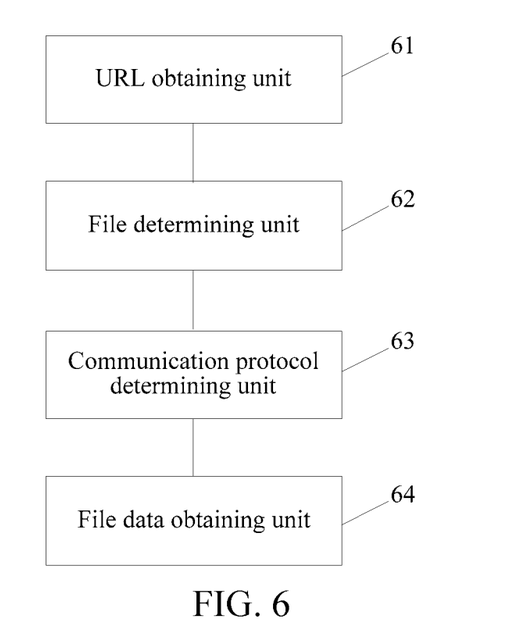
FIG. 6 is a schematic structural diagram of a streaming media file processing apparatus in accordance with some embodiments.

Referring to FIG. 6, FIG. 6 is a schematic structural diagram of a streaming media file processing apparatus according to an embodiment of this application.

As shown in FIG. 6, the apparatus includes:

a URL obtaining unit 61, configured to obtain, in response to a request for downloading a target streaming media file, a uniform resource locator URL of the target streaming media file;

a file determining unit 62, configured to determine, according to pattern information of a header of the URL, whether the target streaming media file is a streaming media file of the MMS Protocol;

a communication protocol determining unit 63, configured to: when a determining result of the file determining unit 62 is yes, determine, according to a preset correspondence between the pattern information and a network communication protocol, a network communication protocol corresponding to the pattern information of the header of the URL as a target network communication protocol; and a file data obtaining unit 64, configured to obtain data of the target streaming media file from a target server by using the target network communication protocol.

In the streaming media file processing apparatus provided in this embodiment of this application, a file determining unit determines, by means of a URL of a streaming media file, whether the streaming media file is a file of the MMS Protocol. If it is determined that the streaming media file is a file of the MMS Protocol, a communication protocol determining unit determines, according to a preset correspondence between pattern information of the URL and a network communication protocol, a network communication protocol corresponding to the pattern information of the URL of the target streaming media file. Further, a file data obtaining unit pulls data of the target streaming media file according to the protocol. By using the streaming media file processing apparatus provided in this application, download of a streaming media file of the MMS Protocol is implemented in a mobile terminal, thereby bringing convenience to users.

Figure 7:
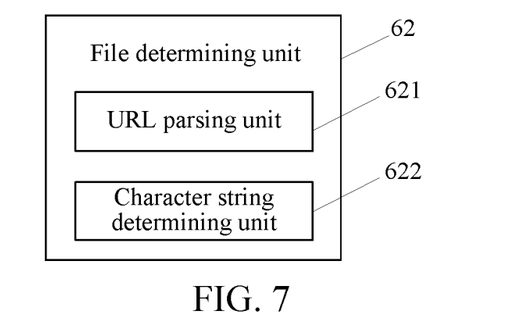
FIG. 7 is a schematic structural diagram of a file determining unit in the streaming media file processing apparatus in accordance with some embodiments.

FIG. 7 shows a schematic structural diagram of the file determining unit in the streaming media file processing apparatus according to the present disclosure. Referring to FIG. 7, the file determining unit 62 may include:

a URL parsing unit 621, configured to parse the URL, and obtain a character string that represents the pattern information of the header of the URL; and a character string determining unit 622, configured to determine whether the character string starts with MMS, and if the character string starts with MMS, determine that the target streaming media file is a streaming media file of the MMS Protocol; otherwise, determine that the target streaming media file is not a streaming media file of the MMS Protocol.

In an embodiment of the present invention, the preset correspondence between the pattern information and the network communication protocol includes: MMSU being corresponding to the User Datagram Protocol UDP Protocol, MMST being corresponding to the Transmission Control Protocol TCP Protocol, and MMSH being corresponding to the Hyper Text Transfer Protocol HTTP Protocol.

Figure 8:
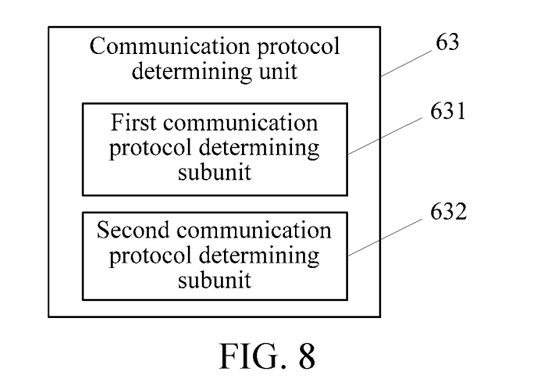
FIG. 8 is a schematic structural diagram of a communication protocol determining unit in the streaming media file processing apparatus in accordance with some embodiments.

FIG. 8 shows a schematic structural diagram of the communication protocol determining unit in the streaming media file processing apparatus according to this embodiment of this application. Referring to FIG. 8, the communication protocol determining unit 63 may include:

a first communication protocol determining subunit 631, configured to determine whether the character string is one of MMSU, MMST, and MMSH; and a second communication protocol determining subunit 632, configured to determine a network communication protocol corresponding to the character string as a target network communication protocol when a determining result of the first communication protocol determining subunit is yes.

Figure 9:
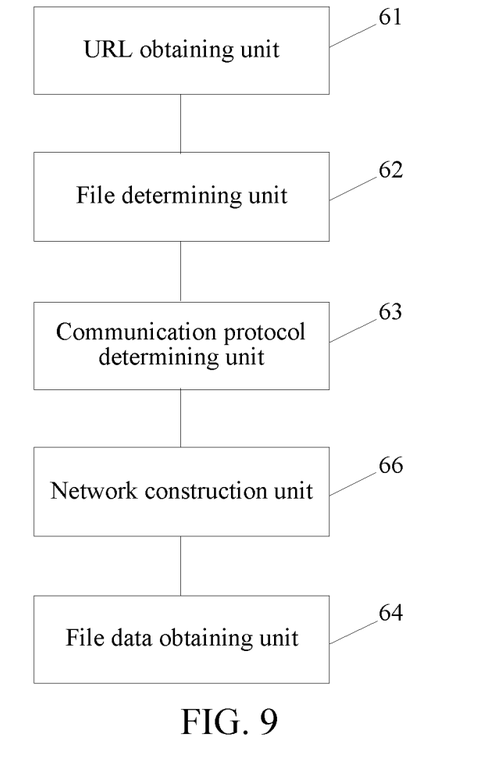
FIG. 9 is a schematic structural diagram of a streaming media file processing apparatus in accordance with some embodiments.

FIG. 9 is a schematic structural diagram of another streaming media file processing apparatus according to an embodiment of this application. Compared with FIG. 6, the streaming media file processing apparatus shown in FIG. 9 further includes: a network construction unit 66, configured to perform, when it is determined that the character string does not include any one of MMSU, MMST, and MMSH, any one of or a combination of the following operations: constructing a network connection to the target server by using the UDP Protocol, and if the network connection is successfully constructed, using the UDP Protocol as the target network communication protocol; constructing a network connection to the target server by using the TCP Protocol, and if the network connection is successfully constructed, using the TCP Protocol as the target network communication protocol; and constructing a network connection to the target server by using the HTTP Protocol, and if the network connection is successfully constructed, using the HTTP Protocol as the target network communication protocol.

The target server is a server designated by a domain name address of the URL.

Figure 10:
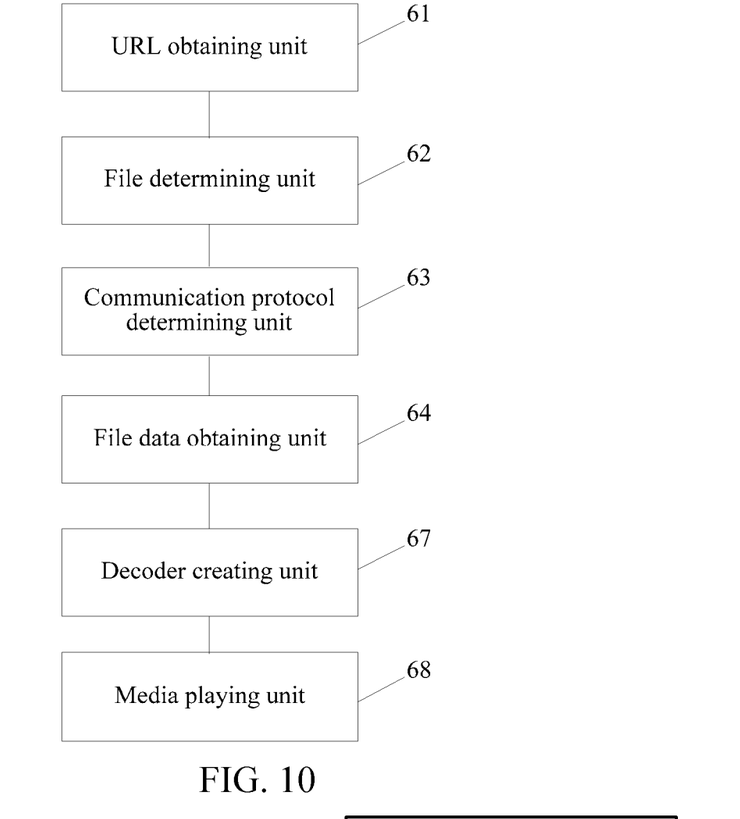
FIG. 10 is a schematic structural diagram of a streaming media file processing apparatus in accordance with some embodiments.

FIG. 10 is a schematic structural diagram of still another streaming media file processing apparatus according to an embodiment of this application. Compared with FIG. 6, the streaming media file processing apparatus shown in FIG. 10 further includes:

a decoder creating unit 67, configured to create and initialize a decoder by using the obtained data of the target streaming media file; and a media playing unit 68, configured to play the data of the target streaming media file after the data of the target streaming media file is decoded by the decoder.

An embodiment of this application further provides a mobile terminal, which includes the streaming media file processing apparatus described above. For descriptions about the streaming media file processing apparatus, refer to descriptions about the foregoing corresponding parts, and details are not described herein again.

Figure 11:
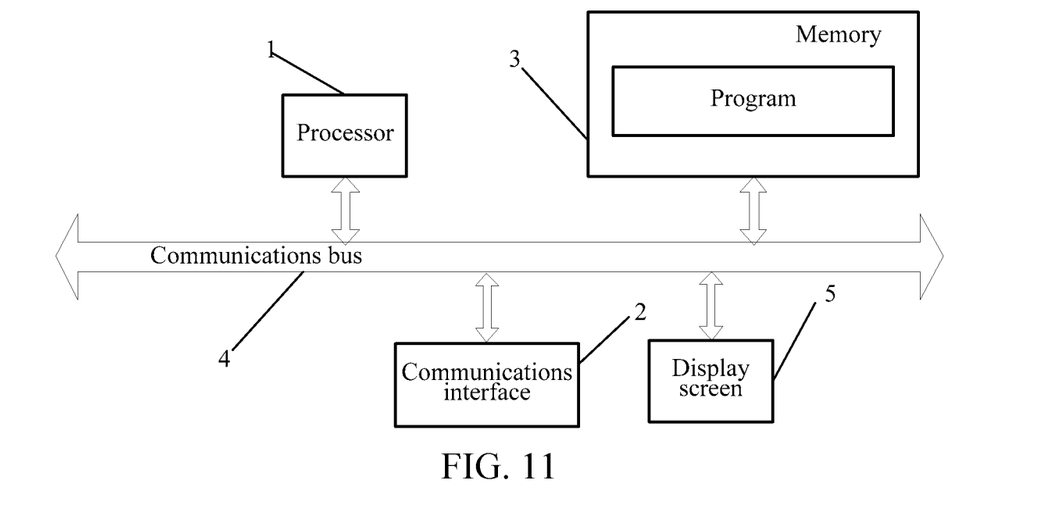
FIG. 11 is a schematic diagram of a hardware structure of a mobile terminal in accordance with some embodiments.

For a hardware structure of the mobile terminal, refer to FIG. 11. FIG. 11 is a schematic diagram of the hardware structure of the mobile terminal according to this embodiment of this application. As shown in FIG. 11, the mobile terminal may include:

a processor 1, a communications interface 2, a memory 3, a communications bus 4, and a display screen 5, where the processor 1, the communications interface 2, the memory 3, and the display screen 5 implement communication between each other by using the communications bus 4;

optionally, the communications interface 2 may be an interface of a communications module, such as an interface of a GSM module;

the processor 1 is configured to execute a program; and the memory 3 is configured to store the program, where the program may include program code, and the program code includes an operation instruction of the processor.

The processor 1 may be a central processing unit CPU, or an application specific integrated circuit ASIC, or one or more integrated circuits configured to implement the embodiments of this application.

The memory 3 may include a high-speed RAM memory, and may further include a non-volatile memory, for example, at least one magnetic disk memory.

The program may be specifically used for:

obtaining, in response to a request for downloading a target streaming media file, a uniform resource locator URL of the target streaming media file;

determining, according to pattern information of a header of the URL, whether the target streaming media file is a streaming media file of the Microsoft Media Server MMS Protocol;

if the target streaming media file is a streaming media file of the MMS Protocol, determining, according to a preset correspondence between the pattern information and a network communication protocol, a network communication protocol corresponding to the pattern information of the header of the URL as a target network communication protocol; and obtaining the target streaming media file from a target server by using the target network communication protocol.

Finally, it should be noted that in the specification, relational terms such as first and second are used only to differentiate an entity or operation from another entity or operation, and do not require or imply that any actual relationship or sequence exists between these entities or operations. Moreover, the terms "include", "comprise", and any variants thereof are intended to cover a non-exclusive inclusion. Therefore, a process, method, object, or apparatus that includes a series of elements not only includes such elements, but also includes other elements not specified expressly, or may include inherent elements of the process, method, object, or apparatus. Unless otherwise specified, an element limited by "include a/an . . . " does not exclude other same elements existing in the process, the method, the article, or the apparatus that includes the element.

The embodiments in this specification are all described in a progressive manner. Description of each of the embodiments focuses on differences from other embodiments, and reference may be made to each other for the same or similar parts among respective embodiments.

The foregoing description of the disclosed embodiments enables a person skilled in the art to implement or use this application. Various modifications to the embodiments are obvious to the person skilled in the art, and general principles defined in this specification may be implemented in other embodiments without departing from the spirit or scope of this application. Therefore, this application will not be limited to the embodiments described in this specification but extends to the widest scope that complies with the principles and novelty disclosed in this specification.

What is claimed is:

1. A media file processing method, comprising:

at a device having one or more processors and memory:

receiving a request for downloading a target streaming media file;

obtaining, in response to the request for downloading the target streaming media file, a uniform resource locator (URL) of the target streaming media file;

determining, according to first pattern information of a header of the URL, whether the target streaming media file is a streaming media file of a Microsoft Media Server (MMS) Protocol;

in accordance with a determination that the target streaming media file is a streaming media file of the MMS Protocol, determining, according to a preset correspondence between URL pattern information and a plurality of network communication protocols, a first network communication protocol of the plurality of network communication protocols, that corresponds to the first pattern information of the header of the URL as a target network communication protocol, wherein the URL pattern information is a character string indicator selected from the group consisting of "MMSU," "MMST," and "MMSH," and wherein (i) the character string indicator "MMSU" selects a User Datagram Protocol (UDP) Protocol as the target network communication protocol, (ii) the character string indicator "MMST" selects a Transmission Control Protocol (TCP) Protocol as the target network communication protocol, and (iii) the character string indicator "MMSH" selects a Hyper Text Transfer Protocol (HTTP) Protocol as the target network communication protocol;

in accordance with a determination that the character string does not comprise any one of MMSU, MMST, and MMSH:

initiating a first protocol communication attempt of network communication with the target server by using the UDP Protocol, and in accordance with a determination that the network communication is successfully established using the UDP Protocol, using the UDP Protocol as the target network communication protocol;

in accordance with a determination that the first protocol communication attempt has failed, initiating a second protocol communication attempt of network communication with the target server by using the TCP Protocol, and in accordance with a determination that the network communication is successfully established using the TCP Protocol, using the TCP Protocol as the target network communication protocol; and in accordance with a determination that the first protocol communication attempt and the second protocol communication attempt have both failed, initiating a third protocol communication attempt of network communication with the target server by using the HTTP Protocol, and in accordance with a determination that the network communication is successfully established using the HTTP Protocol, using the HTTP Protocol as the target network communication protocol; and obtaining the target streaming media file from the target server by using the target network communication protocol.

2. The method according to claim 1, wherein the determining, according to the first pattern information of the header of the URL, whether the target streaming media file is a streaming media file of the MMS Protocol comprises:
parsing the URL to obtain a character string that represents the first pattern information of the header of the URL;
determining whether the character string starts with "MMS", and
in accordance with a determination that the character string starts with "MMS", determining that the target streaming media file is a streaming media file of the MMS Protocol.

3. The method according to claim 1, wherein the target server is a server designated by a domain name address of the URL.

4. The method according to claim 1, further comprising:
creating and initializing a decoder by using the obtained target streaming media file; and
playing the target streaming media file after the target streaming media file is decoded by the decoder.

5. A device, comprising:
one or more processors; and
memory having instructions stored therein, the instructions, when executed by the one or more processors, cause the device to perform operations comprising:
receiving a request for downloading a target streaming media file;
obtaining, in response to the request for downloading the target streaming media file, a uniform resource locator (URL) of the target streaming media file;
determining, according to first pattern information of a header of the URL, whether the target streaming media file is a streaming media file of a Microsoft Media Server (MMS) Protocol;
in accordance with a determination that the target streaming media file is a streaming media file of the MMS Protocol, determining, according to a preset correspondence between URL pattern information and a plurality of network communication protocols, a first network communication protocol of the plurality of network communication protocols, that corresponds to the first pattern information of the header of the URL as a target network communication protocol, wherein the URL pattern information is a character string indicator selected from the group consisting of "MMSU," "MMST," and "MMSH," and wherein (i) the character string indicator "MMSU" selects a User Datagram Protocol (UDP) Protocol as the target network communication protocol, (ii) the character string indicator "MMST" selects a Transmission Control Protocol (TCP) Protocol as the target network communication protocol, and (iii) the character string indicator "MMSH" selects a Hyper Text Transfer Protocol (HTTP) Protocol as the target network communication protocol;
in accordance with a determination that the character string does not comprise any one of MMSU, MMST, and MMSH:
initiating a first protocol communication attempt of network communication with the target server by using the UDP Protocol, and in accordance with a determination that the network communication is successfully established using the UDP Protocol, using the UDP Protocol as the target network communication protocol;
in accordance with a determination that the first protocol communication attempt has failed, initiating a second protocol communication attempt of network communication with the target server by using the TCP Protocol, and in accordance with a determination that the network communication is successfully established using the TCP Protocol, using the TCP Protocol as the target network communication protocol; and
in accordance with a determination that the first protocol communication attempt and the second protocol communication attempt have both failed, initiating a third protocol communication attempt of network communication with the target server by using the HTTP Protocol, and in accordance with a determination that the network communication is successfully established using the HTTP Protocol, using the HTTP Protocol as the target network communication protocol; and
obtaining the target streaming media file from the target server by using the target network communication protocol.

6. The device according to claim 5, wherein the determining, according to the first pattern information of the header of the URL, whether the target streaming media file is a streaming media file of the MMS Protocol comprises:
parsing the URL to obtain a character string that represents the first pattern information of the header of the URL;
determining whether the character string starts with "MMS", and
in accordance with a determination that the character string starts with "MMS", determining that the target streaming media file is a streaming media file of the MMS Protocol.

7. The device according to claim 5, wherein the target server is a server designated by a domain name address of the URL.

8. The device according to claim 5, wherein the operations further comprise:
creating and initializing a decoder by using the obtained target streaming media file; and
playing the target streaming media file after the target streaming media file is decoded by the decoder.

9. A non-transitory computer-readable storage medium storing instructions, the instructions when executed by one or more processors, cause the one or more processors to perform operations comprising:
receiving a request for downloading a target streaming media file;
obtaining, in response to the request for downloading the target streaming media file, a uniform resource locator (URL) of the target streaming media file;
determining, according to first pattern information of a header of the URL, whether the target streaming media file is a streaming media file of a Microsoft Media Server (MMS) Protocol;
in accordance with a determination that the target streaming media file is a streaming media file of the MMS Protocol, determining, according to a preset correspondence between URL pattern information and a plurality of network communication protocols, a first network communication protocol of the plurality of network communication protocols, that corresponds to the first pattern information of the header of the URL as a target network communication protocol, wherein the URL pattern information is a character string indicator selected from the group consisting of "MMSU," "MMST," and "MMSH," and wherein (i) the character string indicator "MMSU" selects a User Datagram Protocol (UDP) Protocol as the target network communication protocol, (ii) the character string indicator "MMST" selects a Transmission Control Protocol (TCP) Protocol as the target network communication protocol, and (iii) the character string indicator "MMSH" selects a Hyper Text Transfer Protocol (HTTP) Protocol as the target network communication protocol;

in accordance with a determination that the character string does not comprise any one of MMSU, MMST, and MMSH:

initiating a first protocol communication attempt of network communication with the target server by using the UDP Protocol, and in accordance with a determination that the network communication is successfully established using the UDP Protocol, using the UDP Protocol as the target network communication protocol;

in accordance with a determination that the first protocol communication attempt has failed, initiating a second protocol communication attempt of network communication with the target server by using the TCP Protocol, and in accordance with a determination that the network communication is successfully established using the TCP Protocol, using the TCP Protocol as the target network communication protocol; and    in accordance with a determination that the first protocol communication attempt and the second protocol communication attempt have both failed, initiating a third protocol communication attempt of network communication with the target server by using the HTTP Protocol, and in accordance with a determination that the network communication is successfully established using the HTTP Protocol, using the HTTP Protocol as the target network communication protocol; and obtaining the target streaming media file from the target server by using the target network communication protocol.

10. The computer-readable storage medium according to claim 9, wherein the determining, according to the first pattern information of the header of the URL, whether the target streaming media file is a streaming media file of the MMS Protocol comprises:

parsing the URL to obtain a character string that represents the first pattern information of the header of the URL;

determining whether the character string starts with "MMS", and    in accordance with a determination that the character string starts with "MMS", determining that the target streaming media file is a streaming media file of the MMS Protocol.

11. The computer-readable storage medium according to claim 9, wherein the target server is a server designated by a domain name address of the URL.

\* \* \* \* \*